(12) United States Patent
Je et al.

(10) Patent No.: US 7,773,949 B2
(45) Date of Patent: Aug. 10, 2010

(54) MULTI-TRANSMISSION/RECEPTION ANTENNA DEVICE AND MULTI-TRANSMISSION/RECEPTION METHOD IN MULTI-USER AND MULTI-CELL ENVIRONMENT

(75) Inventors: Huiwon Je, Gwacheon-si (KR); Kwangbok Lee, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 795 days.

(21) Appl. No.: 11/582,296

(22) Filed: Oct. 18, 2006

(65) Prior Publication Data
US 2007/0298718 A1 Dec. 27, 2007

(30) Foreign Application Priority Data
Jun. 23, 2006 (KR) ...................... 10-2006-0057007

(51) Int. Cl.
H04B 15/00 (2006.01)
(52) U.S. Cl. ..................................... 455/63.1
(58) Field of Classification Search ................ 455/436, 455/562.1, 63.1; 375/260, 350, 224; 370/355, 370/328
See application file for complete search history.

(56) References Cited

U.S. PATENT DOCUMENTS

| | | | | |
|---|---|---|---|---|
| 7,206,607 | B2* | 4/2007 | Kim et al. ................ | 455/562.1 |
| 2002/0001352 | A1* | 1/2002 | Stirling-Gallacher et al. ........................... | 375/260 |
| 2003/0002490 | A1* | 1/2003 | Wong et al. .................. | 370/355 |
| 2003/0016737 | A1* | 1/2003 | Wu et al. ..................... | 375/224 |
| 2006/0094363 | A1* | 5/2006 | Kang et al. ................ | 455/63.1 |
| 2007/0049275 | A1* | 3/2007 | Simeon ....................... | 455/436 |

OTHER PUBLICATIONS

Miller et al, "Estimation of Co-Channel Signals with Linear Complexity," IEEE Transactions on Communications, vol. 49, No. 11, 2001 pp. 1997-2005.
Shine et al, "Antenna-Assisted Round Robin Scheduling for MIMO Cellular Systems," IEEE Communications Letters, vol. 7, No. 3, 2003 pp. 109-111.

(Continued)

Primary Examiner—Matthew D Anderson
Assistant Examiner—Gennadiy Tsvey
(74) Attorney, Agent, or Firm—Dickstein Shapiro LLP

(57) ABSTRACT

The invention relates to a multi-transmission/reception antenna device and a multi-transmission/reception method in a multi-user and multi-cell environment. When a plurality of spatial subchannels having a multi-user and a multi-transmission/reception antenna are allocated to users (that is, user terminals), a user group to be supported and the number of users are selected in consideration of an influence of interference signals from adjacent cells. Accordingly, variability and independence of channels for users and interference signals from adjacent cells can be effectively used, thereby improving a transfer rate of a wireless communication system. The invention allows data transfer at higher speed with limited wireless resources. In particular, an influence of interference from adjacent cells that is inevitable in a multi-cell environment primarily used for the efficient use of wireless resources can be removed using a multi-transmission/reception antenna, while a transfer rate of each user can be effectively increased.

27 Claims, 4 Drawing Sheets

OTHER PUBLICATIONS

Blum et al, "MIMO Capacity with Interference," IEEE Journal on Selected Areas in Communications, vol. 21, No. 5, 2003 pp. 793-801.

Dai et al, "Downlink Capacity of Interference-Limited MIMO Systems with Joint Detection," IEEE Transactions on Wireless Communications, vol. 3, No. 2, 2004 pp. 442-453.

Lau, "Analytical Framework for Multiuser Uplink MIMO Space-Time Scheduling Design with Convex Utility Functions," IEEE Transactions on Wireless Communications, vol. 3, No. 5, 2004 pp. 1832-1843.

* cited by examiner

FIG.2

| USER GROUP \ USER NUMBER | 1 | 2 | 3 | 4 | SUM OF TRANSFER RATES |
|---|---|---|---|---|---|
| 1 | ○ | | | | 1.23 |
| 2 | | ○ | | | 2.10 |
| 3 | | | ○ | | 0.55 |
| 4 | | | | ○ | 0.73 |
| 5 | ○ | ○ | | | 2.08 |
| 6 | ○ | | ○ | | 2.63 |
| 7 | ○ | | | ○ | 1.23 |
| 8 | | ○ | ○ | | 3.76 |
| 9 | | ○ | | ○ | 3.22 |
| 10 | | | ○ | ○ | 1.46 |
| 11 | ○ | ○ | ○ | | 0.86 |
| 12 | ○ | ○ | | ○ | 3.12 |
| 13 | ○ | | ○ | ○ | 4.02 |
| 14 | | ○ | ○ | ○ | 3.23 |
| 15 | ○ | ○ | ○ | ○ | 3.55 |

( ○ : USER TO BE SELECTED)

MULTI-TRANSMISSION/RECEPTION ANTENNA DEVICE AND MULTI-TRANSMISSION/RECEPTION METHOD IN MULTI-USER AND MULTI-CELL ENVIRONMENT

BACKGROUND OF THE INVENTION

1. Field of the Invention

The present invention relates to a multi-transmission/reception antenna device and a multi-transmission/reception method in a multi-user and multi-cell environment for uplink and downlink. In particular, the present invention relates to a multi-transmission/reception antenna device and a multi-transmission/reception method in a multi-user and multi-cell environment that can appropriately select a user using channel response information of a user to be selected in a cell and information of interference signals from adjacent cells.

2. Description of the Related Art

In general, a wireless communication system that uses a multi-transmission/reception antenna is a communication system that has been developed in order to achieve a large-bit transfer rate in a limited bandwidth. In such a wireless communication system, a multi-antenna is used at a transmission/reception terminal, and an appropriate transceiver structure is adopted accordingly, thereby achieving a high transfer rate. At this time, the transmitting unit multiplies individual items of a signal vector to be transmitted by individual allocated power values, and multiplies the signal vector multiplied by the allocated power values by a weighted matrix of a transmission antenna again. The receiving unit also multiplies the individual items of the transmitted signal vector by an appropriate weighted matrix so as to generate a plurality of subchannels in a space domain. Independent data streams can be transmitted through the individual subchannels.

In a known multi-transmission/reception antenna system, a technology that assumes a one-to-one wireless communication system having a pair of transceivers is applied, leaving presence of other cells generating interference signals out of consideration. In addition, in order to achieve a higher transfer rate, a multi-user multi-transmission/reception antenna system that can obtain advantages of multiplexing of a multi-user environment has been researched for an uplink (K.-N. Lau, "Analytical framework for multiuser uplink MIMO space-time scheduling design with convex utility functions," IEEE Transactions on Wireless Communications, vol. 3, no. 5, September 2004) and a downlink (O.-S. Shin, and K. B. Lee, "Antenna-assisted round robin scheduling for MIMO cellular systems," IEEE Communications Letters, vol. 7, no. 3, pp. 109-111, March 2003).

However, a research on an existing multi-user multi-transmission/reception antenna system has a limitation in that a single cell environment is taken into consideration, but an influence by an interference signal from adjacent cells in an actual mobile communication environment is not taken into full consideration.

Meanwhile, unlike the multi-user environment, for a single user environment, a research on an influence of an interference signal from adjacent cells has progressed. Blum has researched downlink performance when a transmission method is determined in consideration of the interference signal from adjacent cells in a multi-cell environment (R. S. Blum, "MIMO capacity with interference," IEEE Journal on Selected Areas in Communications, vol 21, no. 5, pp. 793-801, June 2003). (In this paper, a research has progressed in a multi-link environment, not a multi-cell environment, but, when a cell structure of a cellular system is applied to a multi-link environment, it is regarded as a multi-cell environment.) Further, Dai et al have suggested a receiver system that takes an influence of interference from adjacent cells into consideration in a downlink multi-transmission/reception antenna environment where interference from adjacent cells exist (H. Dai, A. F. Molisch, and H. V. Poor, "Downlink capacity of interference-limited MIMO systems with joint detection, IEEE Transactions on Wireless Communications, vol. 3, no. 2, March 2004).

However, the researches of Blum and Dai et al assume only downlink case and are limited to the case which assumes single user in each cell. Researches on the influence of an interference signal from adjacent cells for uplink multiuser systems are insufficient.

SUMMARY OF THE INVENTION

The multi-cell environment has a disadvantage in that performance significantly deteriorates due to an interference signal from adjacent cells in most regions close to a cell boundary. Accordingly, if an influence of intercell interference is taken into consideration upon selection of a user group, advantages of multi-user multiplexing and removal of the interference signal from an adjacent cell are simultaneously achieved, thereby improving performance of a multi-transmission/reception antenna system. To this end, a research on a system that can select a user with low complexity for both uplink and downlink is required.

The invention has been suggested according to this technical requirement, and it is an object of the invention to provide a multi-transmission/reception antenna device and a multi-transmission/reception method in a multi-user and multi-cell environment that can efficiently select a user group which uses a plurality of subchannels provided by a multi-transmission/reception antenna in the same frequency-time domain, in consideration of an interference signal from an adjacent cell in a multi-user and multi-cell environment.

It is another object of the invention to provide a multi-transmission/reception antenna device and a multi-transmission/reception method in a multi-user and multi-cell environment that can reduce complexity of selection of a user group and efficiently reflect a channel response of each user and an influence of interference from adjacent cells, thereby providing improved performance.

In order to achieve the above-described objects, according to an exemplary embodiment of the invention, it is provided that a multi-transmission/reception antenna device in a multi-user and multi-cell environment, for each cell, includes a plurality of first units each having a predetermined antenna, and a second unit in wireless communication with the plurality of first units.

The second unit includes an estimation unit that estimates channel information on signals from the individual first units and estimates a correlation matrix of noise and interference signals from adjacent cells; a calculation unit that calculates the sum of transfer rates for each user group having at least one first unit using the information estimated by the estimation unit; a determination unit that determines one user group by comparing the sum of the transfer rates of each user groups calculated by the calculation unit; and a feedback unit that feedbacks information on the user group determined by the determination unit to the first units of a corresponding cell.

According to another embodiment of the invention, it is provided that a multi-transmission/reception method in a multi-user and multi-cell environment, for each cell, includes a plurality of first units each having a predetermined antenna, and a second unit in wireless communication with the plurality of first units.

The method includes causing the second unit to estimate channel information on signals from the individual first units and to estimate a correlation matrix of noise and interference signals from adjacent cells; causing the second unit to calculate the sum of transfer rates for each user group having at least one first unit using the estimated information; causing the second unit to determine one user group by comparing the calculated sum of the transfer rates of each user group, and causing the second unit to feedback information on the determined user group to the first units of a corresponding cell.

According to another embodiment of the invention, it is provided that a multi-transmission/reception antenna device in a multi-user and multi-cell environment, for each cell, includes a plurality of first units each having a predetermined antenna, and a second unit in wireless communication with the plurality of first units, Each of the first units includes an estimation unit that estimates channel information on a signal from the second unit of a corresponding cell and estimates a correlation matrix of noise and interference signals from adjacent cells; and a feedback unit that feedbacks the information estimated by the estimation unit to the second unit of the corresponding cell.

The second unit includes a calculation unit that calculates the sum of transfer rates for each user group having at least one first unit using the feedbacked information; and a determination unit that determines one user group by comparing the sum of the transfer rates of each user group calculated by the calculation unit.

According to another embodiment of the invention, it is provided that a multi-transmission/reception method in a multi-user and multi-cell environment, for each cell, includes a plurality of first units each having a predetermined antenna, and a second unit in wireless communication with the plurality of first units.

The method includes causing each of the first units to estimate channel information on a signal from the second unit of a corresponding cell and to estimate a correlation matrix of noise and interference signals from adjacent cells, causing each of the first units to feedback the estimated information to the second unit of the corresponding cell, causing the second unit to calculate the sum of transfer rates for each user group having at least one first unit using the feedbacked information, and causing the second unit to determine one user group by comparing the calculated sum of the transfer rates of each user group.

BRIEF DESCRIPTION OF THE DRAWINGS

FIG. 2 is a diagram illustrating a process of selecting one user group among all selectable user groups in a performance calculation unit and a user group and transmission method determination unit used in an exemplary embodiment of the invention;

DESCRIPTION OF THE PREFERRED EMBODIMENTS

Embodiments of the invention will now be described with reference to the accompanying drawings.

First Embodiment—Description Upon Uplink

Figure 1:
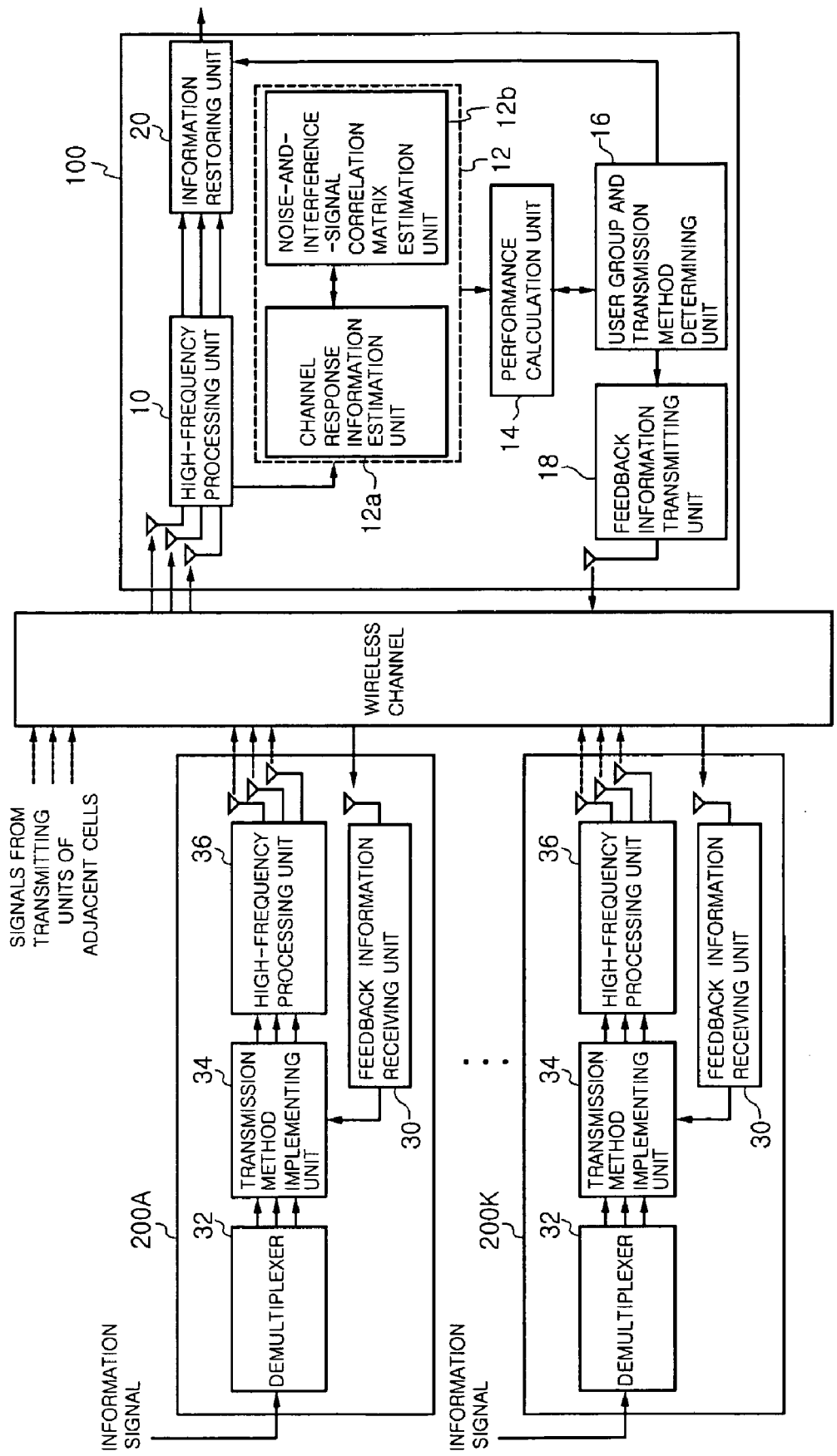
FIG. 1 is a block diagram showing a system where K user terminals each having a multi-transmission/reception antenna transmit data streams to one base station having a multi-transmission/reception antenna in a multi-user and multi-cell environment.

FIG. 1 is a block diagram showing a system where K user terminals each having a multi-transmission/reception antenna transmit data streams to one base station having a multi-transmission/reception antenna in a multi-user and multi-cell environment.

The first embodiment relates to a description for uplink, and, in FIG. 1, a receiving unit 100 is referred to as a base station, and transmitting units 200A, . . . , and 200K are referred to as user terminals or mobile stations. In FIG. 1, for better understanding, one receiving unit 100 and a plurality of transmitting units 200A, . . . , and 200K are shown in one cell. Actually, a plurality of cells exist and, in each cell, one receiving unit 100 and a plurality of transmitting units 200A, . . . , and 200K shown in FIG. 1 exist.

The receiving unit 100 includes a high-frequency processing unit 10, a channel estimation unit 12, a performance calculation unit 14, a user group and transmission method determination unit 16, a feedback information transmitting unit 18, and an information restoring unit 20.

The high-frequency processing unit 10 receives high-frequency signals transmitted from a plurality of transmission antennas of the individual transmitting units 200A, . . . , and 200K using a plurality of reception antennas and converts them into baseband signals.

The channel estimation unit 12 estimates channel information of the transmitting units 200A, . . . , and 200K of corresponding cell and estimates a correlation matrix of noise and inference signals from adjacent cells.

The channel estimation unit 12 includes a channel information estimation unit 12a that estimates the channel information from the baseband signals output from the high-frequency processing unit 10 using pilot signals and the like, and a noise-and-interference-signal correlation matrix estimation unit 12b that estimates the correlation matrix of noise and interference signals remaining after signals transmitted from the transmitting units 200A, . . . , and 200K of corresponding cell are subtracted from the baseband signals output from the high-frequency processing unit 10.

Here, the estimation method of the channel estimation unit 12 will be described in detail. Since the following estimation method is just for illustrative purposes, and various estimation methods can be used, the invention is not limited to the following description.

For example, when it is assumed that J transmitting units each transmitting one data stream are selected, a data signal y received by the receiving unit 100 can be expressed by the following equation 1.

$$y = H_S P_S X_S + H_I P_I N_I + n \qquad \text{Equation 1}$$

Here, $H_S$ is a matrix representing channel responses formed between transmission antennas of the selected J transmitting units and $N_r$ reception antennas of the receiving unit, $P_S$ is a matrix representing transmission power of the individual transmitting units, and $X_S$ is a matrix representing data bits to be transmitted by the individual transmitting units.

Specifically, $H_S=[h_1, h_2, \ldots, h_J]$, $P_S=\text{diag}(p_1, p_2, \ldots, p_J)$, and $X_S=\text{diag}(x_1, x_2, \ldots, x_J)$. Here, $h_j$ represents channel responses formed between the transmitting unit j and the $N_r$ reception antennas of the receiving unit, $p_j$ represents a square root of power allocated to the data stream transmitted by the transmitting unit j, and $x_j$ represents transmission data.

Further, $H_I$ represents a matrix representing channel responses formed between transmission antennas of F transmitting units sending interference signals at adjacent cells and $N_r$ reception antennas of the receiving unit, $P_I$ is a matrix representing transmission power of the individual transmitting units sending interference signals, and $X_I$ is a matrix representing data bits to be transmitted by the individual transmitting units sending interference signals. More specifically, $H_I=[h_{I,1}, h_{I,2}, \ldots, h_{I,F}]$, $P_I=\text{diag}(P_{I1}, P_{I2}, \ldots, P_{IF})$, and $X_I=\text{diag}(x_{I1}, x_{I2}, \ldots, x_{IF})$.

Here, $h_{I,f}$ represents channel responses formed between transmitting units sending interference signals at adjacent cells and $N_r$ reception antennas of the receiving unit, $P_{If}$ represents a square root of power allocated a data stream to be transmitted by a transmitting unit f sending an interference signal at adjacent cells, and $X_{If}$ represents transmission data. n is a matrix representing noise components, that is, $n=[n_1, n_2, \ldots, n_{Nr}]$, and $n_i$ represents a noise component of a reception antenna i.

Accordingly, the channel information estimation unit 12a estimates channel information (that is, $H_S P_S$ in Equation 1) of the transmitting units 200A, . . . , and 200K in corresponding cell. The estimation of the channel information can be easily achieved according to the related art (C. L. Miller, D. P. Taylor, and P. T. Gough, "Estimation of co-channel signals with linear complexity," IEEE Trans. Commun., vol. 49, no. 11, pp. 1997-2005, November 2001).

The noise-and-interference-signal correlation matrix estimation unit 12b estimates a correlation matrix between noise signals received by the individual reception antennas and interference signals from adjacent cells. That is, an Nr×Nr correlation matrix (that is, $H_I P_I^2 H_I^H + \sigma^2 I_{Nr}$) for noise detected by individual Nr reception antennas of the receiving unit 100 and the interference signals is calculated. In the correlation matrix, a superscript H represents Hermitian of the matrix, $\sigma^2$ represents distribution of noise, and $I_{Nr}$ represents an Nr identity matrix.

As such, as a method of distinguishing the noise and interference signals from the signals of the transmitting units 200A, . . . , and 200K in corresponding cell, the following three methods can be exemplified.

As the first method, signals received by a receiving unit in an arbitrary cell in a multi-cell environment includes signals transmitted from the transmitting units 200A, . . . , and 200K in corresponding cell and interference signals and noise signals transmitted by transmitting units in other cells.

The signals correspond to y in Equation 1. At this time, when the channel information between transmitting/receiving units represented by $H_S P_S$ of Equation 1 is estimated using predefined pilot signals sent from the transmitting units 200A, . . . , and 200K in corresponding cell by the above-described method, $X_S$ in Equation 1 corresponding to the signals transmitted from the transmitting units 200A, . . . , and 200K can be restored.

Next, $H_I P_I X_I + n$ of Equation 1 corresponding to the noise and interference signals of the received signal can be extracted by subtracting the signal $H_S P_S X_S$ of corresponding signal from the received signal y. In such a manner, by correlating the extracted noise and interference signals for a predetermined time, the correlation matrix $H_I P_I^2 H_I^H + \sigma^2 I_{Nr}$ of the noise and interference signals can be estimated.

Further, the estimated correlation matrix of the noise and interference signals may be used to more accurately estimate signals of the corresponding cell again. In such a manner, by repeatedly performing the signal estimation of the corresponding cell and the estimation of the noise and interference signals from adjacent cells, accuracy of the channel estimation can be increased.

The second method is a modification of the first method, and a process of estimating the channel information using the pilot signals and restoring the signals transmitted from the transmitting units 200A, . . . , and 200K of the corresponding cell is the same as the first method. However, in the second method, high accuracy can be obtained by averaging the received signal y even though the process from the estimation to the restoration is not repeated.

That is, in the second method, the signal y received by the receiving unit in an arbitrary cell in a multi-cell environment is averaged. The received signal y may be averaged by sampling and correlating for a predetermined time. For example, the received signal y can be averaged by taking the correlation matrix $E\{y_S y_S^H\}$. Through averaging of the correlation matrix, correlation matrixes $E\{X_S X_S^H\}$ and $E\{X_I X_I^H\}$ are assumed as an identity matrix $I_{Nr}$. Accordingly, even though information on $X_S$ and $X_I$ are not known, the estimation of the correlation matrix for noise and interference can be performed.

At this time, the channel information between the transmitting/receiving units of the corresponding cell represented by $H_S P_S$ of Equation 1 using the predefined pilot signals sent from the transmitting units 200A, . . . , and 200K of the corresponding cell is estimated by the above-described method.

Subsequently, by subtracting the correlation matrix $H_S P_S^2 X_S^H$ corresponding to the signals transmitted from the transmitting units 200A, . . . , and 200K of the corresponding cell from the correlation matrix $E\{y_S y_S^H\}$, $H_I P_I^2 H_I^H + \sigma^2 I_{Nr}$ corresponding to the noise and interference signals in the received signal can be estimated.

According to the second method described above, since the channel information is estimated and the signal is restored by averaging the received signal y for the predetermined time in advance, high accuracy can be obtained with no repetitive process.

As the third method, a frequency-time domain where the transmitting units 200A, . . . , and 200K of the corresponding cell do not send signals is used, and, in this domain, only the interference signals from adjacent cells reach the receiving unit 100.

That is, when it is assumed that the same interference signal is received over various frequency-time domains, if a specific frequency-time domain where the transmitting units 200A, . . . , and 200K in the corresponding cell do not transmit signals is set, a signal received in the specific frequency-time domain is defined as $H_I P_I X_I + n$ where $H_S P_S X_S$ as a signal component of the corresponding cell in Equation 1 does not exist.

A correlation matrix $H_I P_I^2 H_I^H + \sigma^2 I_{Nr}$ of the noise and interference signals can be estimated by correlating the extracted noise and interference signals for a predetermined time. The specific frequency-time domain where the transmitting units 200A, . . . , and 200K of the corresponding cell do not send signals may be separately defined as a prescribed section between the transmitting units 200A, . . . , and 200K and the receiving unit 100 for measurement of the interference signals or may be defined as an empty frequency-time domain generated when a load of data traffic to be transmitted is not large.

Next, the performance calculation unit 14 of the receiving unit 100 calculates the sum of transfer rates when J transmitting units are selected using the channel information (that is, channel information, noise-and-interference-signal correlation matrix, and the like) estimated by the channel estimation unit 12.

As an example of the calculation of the sum of the transfer rates, it is assumed that the performance calculation unit 14 is configured as a minimum mean square error (MMSE) detector. A weighted matrix is calculated through the MMSE detector, and a plurality of subchannels formed in a space domain can be separated by multiplying individual items of a signal vector transmitted from the receiving unit by the weighted matrix. Independent data streams transmitted through the individual subchannels can be detected.

The performance calculation unit 14 can detect a vector $d_S$ representing a data stream transmitted from an arbitrary user group S, like Equation 2. This process can be induced as Equation 2 using an induction process of the above-described known MMSE detector (O.-S. Shin, and K. B. Lee, "Antenna-assisted round robin scheduling for MIMO cellular systems," IEEE Communications Letters, vol. 7, no. 3, pp. 109-111, March 2003).

$$d_S = Q(W_S y)$$

$$W_S = P_S H_S^H (H_S P_S^2 H_S^H + H_I P_I^2 H_I^H + \sigma^2 I_{Nr})^{-1} \quad \text{Equation 2}$$

Equation 2 represents a process of detecting a data stream vector $d_S$ by multiplying the vector y of the received signal by $W_S$. Q( ) represents a slicing operation for distinguishing individual data bits in a time domain, and $H_S$, $P_S$, $H_I$, and $P_I$ constituting $W_S$ are defined by Equation 1. Further, a superscript H represents Hermitian of the matrix, $\sigma^2$ represents distribution of noise, and $I_{Nr}$ represents an Nr identity matrix.

In order to calculate $W_S$, the performance calculation unit 14 receives $P_S H_S^H$ from the channel information estimation unit 12a, and receives and calculates $H_I P_I^2 H_I^H + \sigma^2 I_{Nr}$ from the noise-and-interference-signal correlation matrix estimation unit 12b.

When data is detected as Equation 2, the maximum transfer rate from one selected user group can be calculated as Equation 3.

$$C_S = \sum_{j=1}^{J} \log_2(1 + SINR_{S,j}) \quad \text{Equation 3}$$

$$SINR_{S,j} = \frac{|[W_S H_S P_S]_{jj}|^2}{\sum_{n=1, n \neq j}^{Nr} |[W_S H_S P_S]_{jn}|^2 + \sum_{n=1}^{Nr} [|[W_S H_I P_I]_{jn}|^2 + \sigma^2 |[W_S]_{jn}|^2]}$$

$C_S$ is the sum of transfer rates of an arbitrary user group S having J transmitting units, and $SINR_{S,j}$ represents a signal to interference plus noise ratio (SINR) of the j-th transmitting unit belonging to the user group S.

In Equation 3, $SINR_{S,j}$ can be represented using $W_S$, $H_S$, $P_S$, $H_I$, and $P_I$ described above. Here, $|A|^2$ represents an absolute value of A, and $[A]_{jn}$ represents a component of the j-th row and the j-th column.

Another method of calculating the sum of the transfer rates of each user group in the performance calculation unit 14 of the receiving unit 100 in consideration of an influence of interference signals from adjacent cells will be described. Through multiplication the channel responses of the transmitting units of the corresponding cell by an inverse matrix of the correlation matrix between the noise and interference signals from adjacent cells estimated by the channel estimation unit 12, a so-called channel whitening process, transmitting units can be selected in consideration of the influence of the interference signals from adjacent cells can be selected. The channel whitening process is expressed as Equation 4.

$$R_I^{-1/2} y = R_I^{-1/2} H_S P_S X_S + n' = H'_S P_S X_S$$

$$R_I = E\{H_I P_I^2 H_I^H + \sigma^2 I_{Nr}\} \quad \text{Equation 4}$$

Here, $R_I$ represents an average value of the correlation matrix of the noise and interference signals from adjacent cells, and $H'_S$ is an effective channel matrix obtained as the result of the whitening process and is expressed by $H'_S = R_I^{-1/2} H_S$. n' is a noise component that appears through conversion of the noise and interference signal components after the whitening process, and has a value of 1 by distribution. Then, in Equation 4, $E\{X\}$ represents an average value of X. Further, $R_I$ may be defined as an instantaneous value of $H_I P_I^2 H_I^H + \sigma^2 I_{Nr}$.

After the channel whitening process, when the transfer rates of the individual users are calculated using a linear MMSE receiver, the weighted vector defined in Equation 2 is expressed by Equation 5.

$$W_S = P_S H'_S{}^H (H'_S P_S^2 H'_S{}^H + I_{Nr})^{-1} \quad \text{Equation 5}$$

At this time, the number of columns of a channel response matrix H of the transmitting units in the corresponding cell is equal to the number of selected transmitting units J, and the signal to noise plus interference ratio of the data stream of each transmitting unit obtained by multiplication of the weighted vector is as Equation 6.

$$SINR_{S,j} = \frac{|[W_S H'_S P_S]_{jj}|^2}{\sum_{n=1, n \neq j}^{Nr} |[W_S H'_S P_S]_{jn}|^2 + \sum_{n=1}^{Nr} [|[W_S]_{jn}|^2]} \quad \text{Equation 6}$$

With Equation 6, the sum of the transfer rates of the selected J transmitting units is calculated. As such, if the channel whitening process is first performed, the expression of the MMSE detector can be simplified, and the amount of information feedback described below can be reduced.

Next, the user group and transmission method determination unit 16 selects a desired user group by comparing the sums of the transfer rates of the individual user group calculated by the performance calculation unit 14. Then, the user group and transmission method determination unit 16 determines a transmission method, such as a modulation index and a channel coding rate of each transmitting unit, for the individual transmitting units constituting the user group to be transmitted using information on the transfer rate calculated by the performance calculation unit 14.

In particular, the invention relates to an apparatus and method of improving performance of a user selection method, in which the number of transmitting units J is not fixed. Accordingly, in the invention, the number of transmitting units J to be selected varies from 1 to K. When power of the interference signals from adjacent cells is high or when the number of interference signals is large, the number of transmitting units to be selected may be decreased. The user group and transmission method determination unit 16 searches a user group, including a case the number of transmitting units to be selected varies from 1 to K.

Hereinafter, a method of selection of a user group having the largest sum of the transfer rates will be described. However, it should be noted that, since the selection of the user group may have other objective functions than the maximum transfer rate according to selection of a scheduler, the invention is not limited to a method described below.

Referring to FIG. 2, when the total number of transmitting units in one cell is 4 (K=4), the user group and transmission method determination unit 16 calculates the sums of the transfer rates of the transmitting units for all user groups corresponding to the number of transmitting units of 1 to 4 (in FIG. 2, 15 user groups exist) in connection with the performance calculation unit 14, and then selects a user group having the largest sum of the transfer rates through the comparison. In FIG. 2, a user group 13 is selected. A user to be selected in FIG. 2 is referred to as a user terminal or a mobile station.

Next, another method of selecting a user group having the largest sum of the transfer rates will be described below. The number of groups each having J transmitting units among the K transmitting units is $_KC_J$. In the above-described method in which the transfer rates of all possible groups are calculated and compared, it is possible to find a user group having the highest transfer rate but complexity is high.

Figure 3:
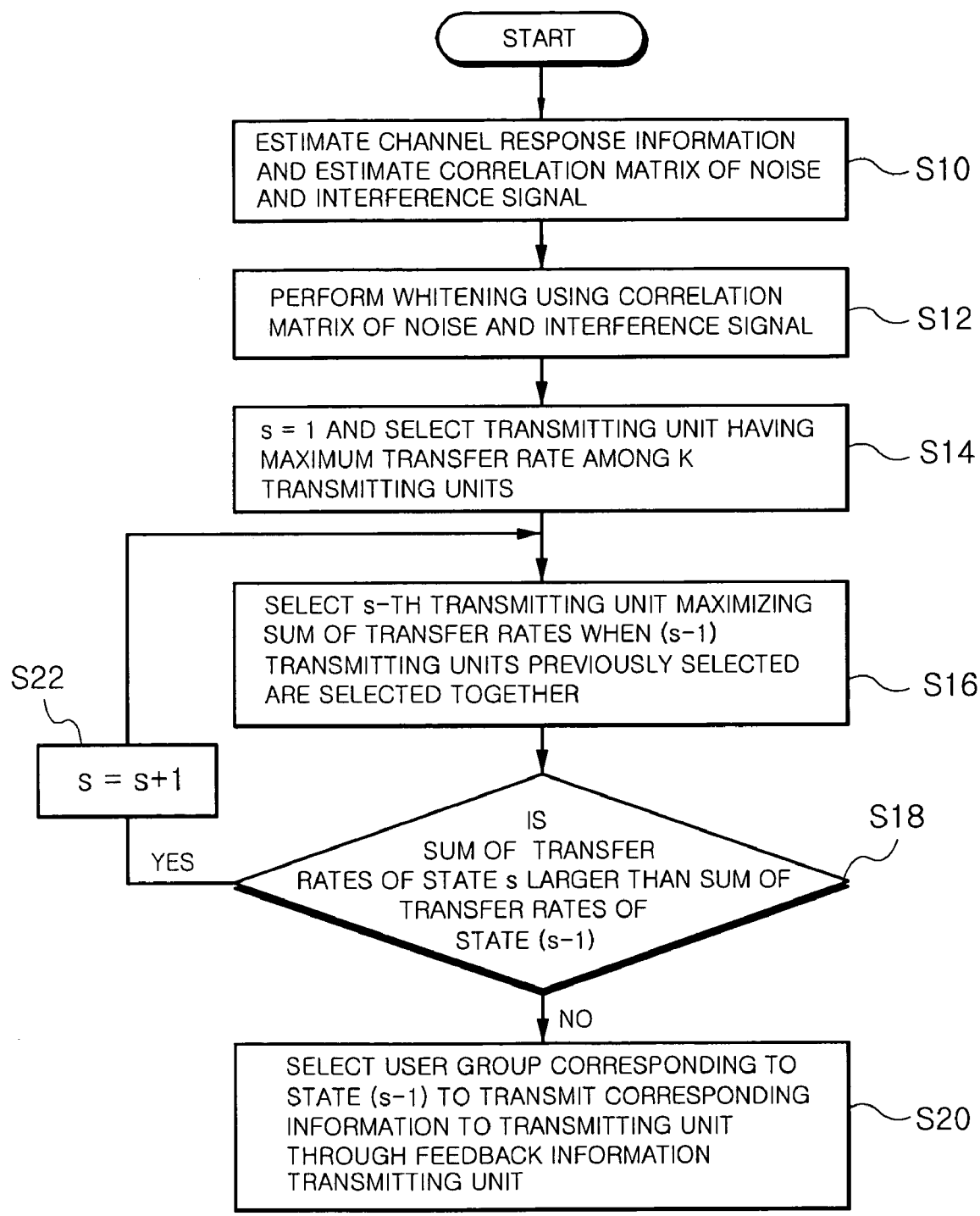
FIG. 3 is a flowchart illustrating the operation of a repetitive search algorithm when a user group is selected by the performance calculation unit and the user group and transmission method determination unit used in the exemplary embodiment of the invention.

Accordingly, based on the method of FIG. 3, the complexity can be significantly reduced, and the performance close to the optimum value can be achieved. The complexity can be significantly reduced by sequentially selecting the transmitting units one by one, without searching all user groups.

That is, referring to FIG. 3, the channel estimation unit 12 estimates the channel information and the correlation matrix of the noise and interference signals from adjacent cells, and sends them to the performance calculation unit 14 (Step S10).

The performance calculation unit 14 performs whitening using the input correlation matrix of the noise and interference signals (Step S12). The whitening process may be performed using a known technology or may be performed as the description of Equation 4.

Next, when one transmitting unit among the K transmitting units is first selected, it is assumed that the selected transmitting unit is a transmitting unit having the highest transfer rate, and this is defined as a state 1 (that is, s=1) (Step S14).

Next, in the state s, when (s−1) transmitting units selected in a state (s−1) are selected together, one transmitting unit is additionally selected such that the sum of the transfer rates of s transmitting units is largest (Step S16).

Subsequently, it is determined whether or not the transfer rate of the transmitting unit selected in the state s is larger than the sum of the transfer rates of a user group selected in the state (s−1) (Step S18).

According to the comparison result, if the transfer rate of the transmitting unit selected in the state s is smaller than the sum of the transfer rates of the user group selected in the state (s−1) (at Step S18, "NO"), the user group corresponding to the state (s−1) is selected and corresponding information is transmitted to the transmitting unit through the feedback information transmitting unit 18 (Step S20).

In contrast, if the transfer rate of the transmitting unit selected in the state s is larger than the sum of the transfer rates of the user group selected in the state (s−1) (at Step S18, "YES"), a state (s+1) progresses (Step S22). In the (s+1), Step is s18 and later are repeated on the basis of the user group selected in the state s.

Accordingly, the number of transmitting units belonging to a finally determined user group can be determined in a fluid manner according to the channel responses and the correlation matrix of the noise and interference signals from adjacent cells, thereby providing improved performance.

Next, the feedback information transmitting unit 18 of the receiving unit 100 transmits the user group finally selected by the user group and transmission method determination unit 16 and information on transfer rates of the individual transmitting units in the finally selected user group to all transmitting units in the corresponding cell, and allows the selected transmitting units to transmit the data streams in a defined frequency-time domain.

Next, the information restoring unit 20 of the receiving unit 100 restores information from the baseband signals output from the high-frequency processing unit 10. At this time, the information is restored in consideration of the transmission method determined by the user group and transmission method determination unit 16.

Meanwhile, each of the transmitting units 200A, . . . , and 200K includes a feedback information receiving unit 30 that receives feedback information transmitted from the feedback information transmitting unit 18 of the receiving unit 100 in a wireless manner using the reception antenna, a demultiplexer 32 that divides an information signal to be transmitted into multiple signal streams, a transmission method implementing unit 34 that receives multiple signal streams from the demultiplexer 32 and multiplies the individual signal streams by the weighted vector and an allocated power value on the basis of the feedback information received by the feedback information receiving unit 30, and a high-frequency processing unit 36 that converts the baseband signals from the transmission method implementing unit 34 into high-frequency signals and transmits the high-frequency signals to the receiving unit 100 using multiple transmission antennas in a wireless manner.

Second Embodiment—Description Upon Downlink

Figure 4:
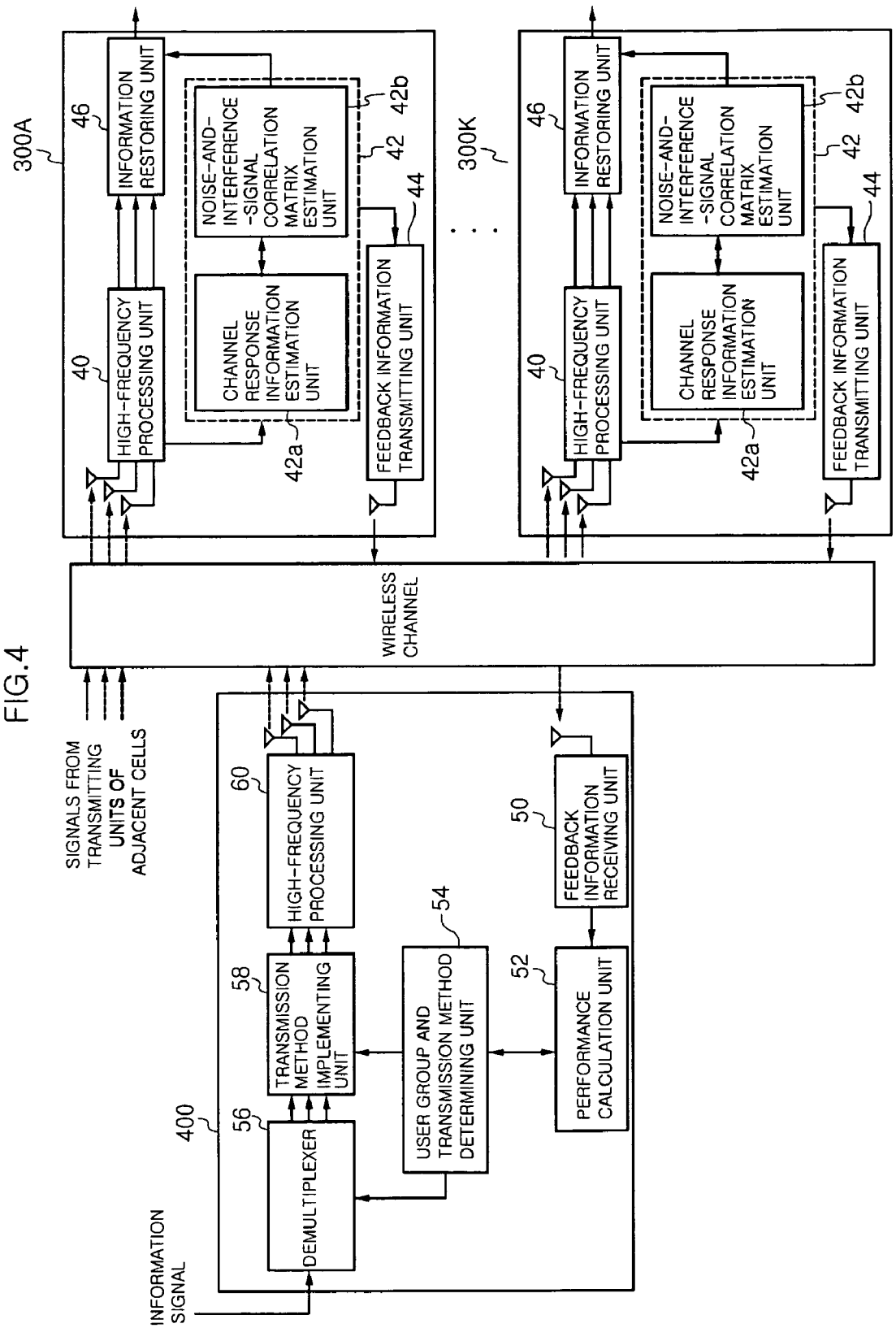
FIG. 4 is a block diagram showing a system where one base station having a multi-transmission/reception antenna transmits data streams to K user terminals each having a multi-transmission/reception antenna in a multi-user and multi-cell environment.

FIG. 4 is a block diagram showing a system where one base station having a multi-transmission/reception antenna transmits data streams to K user terminals each having a multi-transmission/reception antenna in a multi-user and multi-cell environment. The second embodiment relates to a description for downlink, and, in FIG. 4, receiving units 300A, . . . , and 300K are referred to as user terminals or mobile stations and a transmitting unit 400 is referred to as a base station. In FIG. 4, for better understanding, one transmitting unit 400 and a plurality of receiving units 300A, . . . , and 300K are shown in one cell. Actually, a plurality of cells exist and, in each cell, one transmitting unit 400 and a plurality of receiving units 300A, . . . , and 300K shown in FIG. 4 exist.

Each of the receiving units 300A, . . . , and 300K includes a high-frequency processing unit 40, a channel estimation unit 42, a feedback information transmitting unit 44, and an information restoring unit 46.

The high-frequency processing unit 40 converts the high-frequency signals transmitted from multiple transmission antennas in the transmitting unit 400 into the baseband signals using multiple reception antennas.

The channel estimation unit 42 estimates the channel information from the baseband signals from the high-frequency processing unit 40 and estimates the correlation matrix of the noise and interference signals from adjacent cells. The channel estimation unit 42 may be regarded as one having the same configuration and function as the channel estimation unit 12 in the first embodiment. Accordingly, the description of the channel estimation unit 12 in the first embodiment can substitute the description of the channel estimation unit 42, and this substitution is obvious to those skilled in the art.

The feedback information transmitting unit 44 feedbacks the channel information and the correlation matrix of the noise and interference signals from adjacent cells estimated by the channel estimation unit 42 to the transmitting unit 400 of the corresponding cell.

The two kinds of information feedbacked from the feedback information transmitting unit 44 (that is, the channel information and the correlation matrix of the noise and interference signals from adjacent cells) are basically feedbacked separately, but, for the sake of reducing the amount of feedback information, these may be feedbacked to one effective channel, as defined by Equation 4.

That is, the feedback information transmitting unit 44 feedbacks, to the transmitting unit, an effective channel obtained through the whitening process of multiplying the channel information between the receiving units and the transmitting unit by the inverse matrix of the correlation matrix of the noise and interference signals from adjacent cells. Then, only with the effective channel, the transmitting unit 400 can select a user group while taking the influence of the interference signals from adjacent cells into consideration.

This can be performed using Equations 4 to 6. The inverse matrix of the correlation matrix of the noise and interference signals from adjacent cells can be sufficiently calculated by those skilled in the art using a known technology.

In the second embodiment, the feedback information transmitting unit 44 can obtain the effective channel, but the channel estimation unit 42 may obtain the effective channel.

The information restoring unit 46 restores information from the baseband signals output from the high-frequency processing unit 40. At this time, the information is restored in consideration of the correlation matrix of the noise and interference signal estimated by the noise-and-interference-signal correlation matrix estimation unit 42b in the channel estimation unit 42.

Meanwhile, the transmitting unit 400 includes a feedback information receiving unit 50 that receives feedback information transmitted from the feedback information transmitting units 44 of the receiving units 300A, . . . , and 300K in a wireless manner using the reception antenna; a performance calculation unit 52 that calculates the sum of the transfer rates when J receiving units are selected, using the channel information and the correlation matrix of the noise and interference signal from adjacent cells of the individual receiving units 300A, . . . , and 300K received by the feedback information receiving unit 50 or the effective channel; a user group and transmission method determination unit 54 that selects a desired user group by comparing the sums of the transfer rates of the individual user groups obtained by the performance calculation unit 52 and determines a transmission method, such as a modulation index, a coding rate, and the like, for the individual receiving unit constituting the selected user group on the basis of the information of the transfer rates obtained by the performance calculation unit 52; a demultiplexer 56 that divides an information signal to be transmitted into multiple signal streams; a transmission method implementing unit 58 that receives multiple signal streams from the demultiplexer 56 and multiplies the individual signal streams by the weighted matrix and the allocated power value of each transmission antenna on the basis of signals from the user group and transmission method determination unit 54; and a high-frequency processing unit 60 that converts the baseband signals output from the transmission method implementing unit 58 into high-frequency signals and transmits the high-frequency signals to the receiving units 300A, . . . , and 300K in a wireless manner using multiple transmission antennas.

Here, when the performance calculation unit 52 calculates the transfer rates of the individual receiving units 300A, . . . , and 300K using a linear MMSE receiver, the weighted vector (see Equation 5) that is multiplied by the received signals by the selected J receiving units is calculated, then a signal to noise plus interference ratio (see Equation 6) of the data streams of the individual receiving units obtained through the multiplication of the weighted vector is calculated, and subsequently the sum of the transfer rates of the selected J receiving units is calculated using the signal to noise plus interference ratio.

Here, the number of selected J receiving units is in a range of 1 to K (that is, the total number of receiving units in the corresponding cell). Then, the selected J receiving units constitute one user group, like FIG. 2. The operation of the performance calculation unit 52 will be fully understood with reference to the description of the performance calculation unit 14 in the first embodiment.

Next, the user group and transmission method determination unit 54 compares the sums of the transfer rates of the individual user groups obtained by the performance calculation unit 52 so as to select a desired user group. Then, the user group and transmission method determination unit 54 determines the transmission method, such as a modulation index, a coding rate, and the like, for the individual receiving units constituting the selected user group on the basis of the information obtained by the performance calculation unit 52.

In particular, the invention relates to an apparatus and method of improving performance of a user selection method, in which the number of transmitting units J is not fixed. Accordingly, in the invention, the number of transmitting units J to be selected varies from 1 to K. When power of the interference signals from adjacent cells is high or when the number of interference signals is large, the number of transmitting units to be selected may be decreased.

The user group and transmission method determination unit 54 searches a user group, including a case when the number of transmitting units to be selected varies from 1 to K. Then, the operation of selecting a user group having the largest sum of the transfer rates that is performed by the user group and transmission method determination unit 54 will be substituted with the description of the first embodiment.

Although the specified embodiments have been described in the detailed description of the invention, various modifications can be made without departing from the scope of the invention. For example, in the above-described embodiments, an operation of dividing channels for users by a MMSE receiver, and allocating one subchannel for each selected user has been described. However, according to the invention, subchannels may be allocated using a different user selection method. Further, other methods, such as a method of simultaneously performing the user selection and the allocation of a plurality of subchannels for users may be used, thereby improving performance of a wireless communication system having a multi-transmission/reception antenna. Therefore, the scope of the invention is defined by the appended claims, rather than the above-described embodiments, or equivalents thereof.

According to the invention, the following effects can be obtained.

First, when a plurality of spatial subchannels having a multi-user and a multi-transmission/reception antenna are allocated to users (that is, user terminals), a user group to be supported and the number of users are selected in consideration of an influence of interference signals from adjacent cells. Accordingly, variability and independence of channels for users and interference signals from adjacent cells can be effectively used, thereby improving a transfer rate of a wireless communication system.

Second, higher data transmission can be performed with limited wireless resources. In particular, an influence of interference from adjacent cells that is inevitable in a multi-cell environment primarily used for the efficient use of wireless resources can be removed using a multi-transmission/reception antenna, while a transfer rate of each user can be effectively increased.

What is claimed is:

1. A multi-transmission/reception antenna device in a multi-user and multi-cell environment that, for each cell, includes a plurality of first units each having a predetermined antenna, and a second unit in wireless communication with the plurality of first units,
    wherein the second unit includes:
        an estimation unit that estimates channel information on signals from the individual first units and estimates information of noise and interference signals from adjacent cells;
        a calculation unit that calculates the sum of transfer rates for each user group having at least one first unit using the information estimated by the estimation unit;
        a determination unit that determines one user group by comparing the sum of the transfer rates of each user group calculated by the calculation unit; and
        a feedback unit that feedbacks information on the user group determined by the determination unit to the first units of a corresponding cell, and
    wherein the estimation unit estimates the channel information from prescribed pilot signals received from the first units of the corresponding cell, calculates the noise and interference signals from adjacent cells by subtracting the estimated channel information from an arbitrarily received signal, and estimates a correlation matrix of the noise and interference signals by correlating them for a predetermined time.

2. The multi-transmission/reception antenna device in a multi-user and multi-cell environment according to claim 1,
    wherein the estimation unit repeatedly performs the estimation of the channel information of the corresponding cell and the estimation of the correlation matrix of the noise and interference signals by the number of set times in order to increase accuracy.

3. The multi-transmission/reception antenna device in a multi-user and multi-cell environment according to claim 1,
    wherein the estimation unit estimates the channel information from prescribed pilot signals received from the first units of the corresponding cell, and estimates the correlation matrix of the noise and interference signals from adjacent cells by subtracting the correlation matrix of the estimated channel information from correlation of arbitrarily received signals for a predetermined time.

4. The multi-transmission/reception antenna device in a multi-user and multi-cell environment according to claim 1,
    wherein the estimation unit estimates a correlation matrix of the noise and interference signals from adjacent cells received in a frequency-time domain where the first units of the corresponding cell do not send signals.

5. The multi-transmission/reception antenna device in a multi-user and multi-cell environment according to claim 1,
    wherein the calculation unit calculates effective channel information of each of the first units using the estimated information and calculates the sum of the transfer rates for each user group using the calculated effective channel information.

6. The multi-transmission/reception antenna device in a multi-user and multi-cell environment according to claim 1,
    wherein the number of first units for each user group is in a range of 1 to K (where K is the total number of first units in the corresponding cell).

7. The multi-transmission/reception antenna device in a multi-user and multi-cell environment according to claim 1,
    wherein the determination unit further determines a transmission method for the first units in the determined user group.

8. The multi-transmission/reception antenna device in a multi-user and multi-cell environment according to claim 1,
    wherein the second unit is a base station.

9. A multi-transmission/reception method applied to a multi-transmission/reception antenna device in a multi-user and multi-cell environment that, for each cell, includes a plurality of first units each having a predetermined antenna, and a second unit in wireless communication with the plurality of first units, the method comprising:
    (a) causing the second unit to estimate channel information on signals from the individual first units and information of noise and interference signals from adjacent cells;
    (b) causing the second unit to calculate the sum of transfer rates for each user group having at least one first unit using the estimated information;
    (c) causing the second unit to determine one user group by comparing the calculated sum of the transfer rates of each user group; and
    (d) causing the second unit to feedback information on the determined user group to the first units of a corresponding cell,
    wherein step (a) includes estimating the channel information from prescribed pilot signals received from the first units of the corresponding cell, calculating the noise and interference signals from adjacent cells by subtracting the estimated channel information from an arbitrarily received signal, and estimating the correlation matrix of the noise and interference signals by correlating them for a predetermined time.

10. The multi-transmission/reception method in a multi-user and multi-cell environment according to claim 9,
    wherein step (a) repeatedly performs the estimation of the channel information of the corresponding cell and the estimation of the correlation matrix of the noise and interference signals by the number of set times in order to increase accuracy.

11. The multi-transmission/reception method in a multi-user and multi-cell environment according to claim 9,
    wherein step (a) estimates the channel information from prescribed pilot signals received from the first units of the corresponding cell, and estimates the correlation matrix of the noise and interference signals from adjacent cells by subtracting the correlation matrix of the estimated channel information from correlation of arbitrarily received signals for a predetermined time.

12. The multi-transmission/reception method in a multi-user and multi-cell environment according to claim 9,
    wherein step (a) estimates the correlation matrix of the noise and interference signals from adjacent cells received in an empty frequency-time domain where the first units of the corresponding cell do not send signals.

13. The multi-transmission/reception method in a multi-user and multi-cell environment according to claim 12,
wherein the frequency-time domain where the first units of the corresponding cell do not send signals is defined as a prescribed section between the first units and the second unit.

14. The multi-transmission/reception method in a multi-user and multi-cell environment according to claim 9, wherein step (b) includes:
calculating effective channel information of each of the first units using the estimated information; and
calculating the sum of the transfer rates for each user group using the calculated effective channel information.

15. The multi-transmission/reception method in a multi-user and multi-cell environment according to claim 9,
wherein the determination of the user group in step (c) repeatedly selects the first unit allowing the highest sum of the transfer rates and determines a user group having the highest sum of the transfer rates through comparison with the previous sum of the transfer rates.

16. The multi-transmission/reception method in a multi-user and multi-cell environment according to claim 9,
wherein step (c) further determines a transmission method for the first units in the determined user group.

17. The multi-transmission/reception method in a multi-user and multi-cell environment according to claim 9,
wherein the number of first units for each user group is in a range of 1 to K (where K is the total number of first units in the corresponding cell).

18. A multi-transmission/reception antenna device in a multi-user and multi-cell environment that, for each cell, includes a plurality of first units each having a predetermined antenna, and a second unit in wireless communication with the plurality of first units,
wherein each of the first units includes:
an estimation unit that estimates channel information on a signal from the second unit of a corresponding cell and estimates information of noise and interference signals from adjacent cells; and
a feedback unit that feedbacks the information estimated by the estimation unit to the second unit of the corresponding cell, and
the second unit includes:
a calculation unit that calculates the sum of transfer rates for each user group having at least one first unit using the feedbacked information; and
a determination unit that determines one user group by comparing the sum of the transfer rates of each user group calculated by the calculation unit,
wherein the estimation unit estimates the channel information from prescribed pilot signals received from the second unit of the corresponding cell, calculates the noise and interference signals from adjacent cells by subtracting the estimated channel information from an arbitrarily received signal, and estimates a correlation matrix of the noise and interference signals by correlating them for a predetermined time.

19. The multi-transmission/reception antenna device in a multi-user and multi-cell environment according to claim 18, wherein the estimation unit calculates effective channel information of a corresponding first unit using the estimated information and sends the calculated effective channel information to the second unit of the corresponding cell through the feedback unit.

20. The multi-transmission/reception antenna device in a multi-user and multi-cell environment according to claim 18,
wherein the feedback unit calculates effective channel information of a corresponding first unit using the estimated information and sends the calculated effective channel information to the second unit of the corresponding cell.

21. The multi-transmission/reception antenna device in a multi-user and multi-cell environment according to claim 18,
wherein the number of first units for each user group is in a range of 1 to K (where K is the total number of first units in the corresponding cell).

22. The multi-transmission/reception antenna device in a multi-user and multi-cell environment according to claim 18,
wherein the first unit is a user terminal, and the second unit is a base station.

23. A multi-transmission/reception method applied to a multi-transmission/reception antenna device in a multi-user and multi-cell environment that, for each cell, includes a plurality of first units each having a predetermined antenna, and a second unit in wireless communication with the plurality of first units, the method comprising:
(a) causing each of the first units to estimate channel information on a signal from the second unit of a corresponding cell and to estimate information of noise and interference signals from adjacent cells;
(b) causing each of the first units to feedback the estimated information to the second unit of the corresponding cell;
(c) causing the second unit to calculate the sum of transfer rates for each user group having at least one first unit using the feedbacked information; and
(d) causing the second unit to determine one user group by comparing the calculated sum of the transfer rates of each user group,
wherein step (a) includes estimating the channel information from prescribed pilot signals received from the second unit of the corresponding cell, calculating the noise and interference signals from adjacent cells by subtracting the estimated channel information from an arbitrarily received signal, and estimating a correlation matrix of the noise and interference signals by correlating them for a predetermined time.

24. The multi-transmission/reception method in a multi-user and multi-cell environment according to claim 23, wherein step (c) includes:
calculating effective channel information of each of the first units using the feedbacked information; and
calculating the sum of the transfer rates for each user group using the calculated effective channel information.

25. The multi-transmission/reception method in a multi-user and multi-cell environment according to claim 23,
wherein the determination of the user group in step (d) repeatedly selects the first unit allowing the highest sum of the transfer rates and determines a user group having the highest sum of the transfer rates through comparison with the previous sum of the transfer rates.

26. The multi-transmission/reception method in a multi-user and multi-cell environment according to claim 23,
wherein step (d) further determines a transmission method for the first units in the determined user group.

27. The multi-transmission/reception method in a multi-user and multi-cell environment according to claim 23,
wherein the number of first units for each user group is in a range of 1 to K (where K is the total number of first units in the corresponding cell).

* * * * *